(12) United States Patent
Laycock et al.

(10) Patent No.: US 9,720,161 B2
(45) Date of Patent: Aug. 1, 2017

(54) LCD BACKLIGHT DEVICE HAVING LIGHT GUIDE PLATE WITH OPTICAL SCATTERING DOTS

(71) Applicant: BAE SYSTEMS plc, London (GB)

(72) Inventors: Leslie Charles Laycock, Chelmsford (GB); Andrew Graham McCarthy, Chelmsford (GB)

(73) Assignee: BAE SYSTEMS plc, London (GB)

( * ) Notice: Subject to any disclaimer, the term of this patent is extended or adjusted under 35 U.S.C. 154(b) by 79 days.

(21) Appl. No.: 14/433,480

(22) PCT Filed: Oct. 2, 2013

(86) PCT No.: PCT/GB2013/052567
§ 371 (c)(1),
(2) Date: Apr. 3, 2015

(87) PCT Pub. No.: WO2014/053832
PCT Pub. Date: Apr. 10, 2014

(65) Prior Publication Data
US 2015/0253491 A1 Sep. 10, 2015

(30) Foreign Application Priority Data
Oct. 4, 2012 (GB) .................................. 1217735.8

(51) Int. Cl.
*F21V 8/00* (2006.01)
*G02B 27/01* (2006.01)

(52) U.S. Cl.
CPC ........... *G02B 6/0043* (2013.01); *G02B 6/003* (2013.01); *G02B 6/0031* (2013.01);
(Continued)

(58) Field of Classification Search
CPC .... G02B 6/0073; G02B 6/0043; G02B 6/004; G02B 6/0035
See application file for complete search history.

(56) References Cited

U.S. PATENT DOCUMENTS

| 6,345,899 B1 | 2/2002 | Ohkawa et al. |
| 6,386,721 B1 | 5/2002 | Hosseini et al. |
(Continued)

FOREIGN PATENT DOCUMENTS

| CN | 102252175 A | 11/2011 |
| GB | 2313179 A | 11/1997 |
(Continued)

OTHER PUBLICATIONS

JP Office Action received for JP Application No. 2015-535108 dated May 24, 2016. English translation. 6 pages.
(Continued)

*Primary Examiner* — Robert May
(74) *Attorney, Agent, or Firm* — Finch & Maloney PLLC

(57) ABSTRACT

The following invention relates to an improved LCD Backlight, particularly to an improved arrangement of the optical scattering dots within the light guiding plate.

The light guiding plate comprises a lower surface which is formed with a plurality of optical scattering dots, which scatter and reflect the light beams to convert the light beams into a uniform surface light source, characterised wherein the surface area of each optical dot decreases as a function of its distance from at least one of the three edges comprising the LED lights.

20 Claims, 2 Drawing Sheets

(52) U.S. Cl.
CPC ......... *G02B 6/0051* (2013.01); *G02B 6/0065* (2013.01); *G02B 6/0068* (2013.01); *G02B 6/0073* (2013.01); *G02B 6/0083* (2013.01); *G02B 6/0085* (2013.01); *G02B 27/0101* (2013.01)

(56) References Cited

U.S. PATENT DOCUMENTS

| | | | |
|---|---|---|---|
| 7,347,589 B2* | 3/2008 | Ge | F21V 3/00 |
| | | | 362/294 |
| 7,703,970 B2* | 4/2010 | Blach | G02B 6/0018 |
| | | | 362/555 |
| 7,929,072 B2* | 4/2011 | Oohira | G02F 1/133308 |
| | | | 252/299.3 |
| 8,702,293 B2* | 4/2014 | Huang | G02B 6/0043 |
| | | | 362/235 |
| 2001/0017774 A1 | 8/2001 | Ito et al. | |
| 2007/0189039 A1 | 8/2007 | Yokota | |
| 2008/0136995 A1 | 6/2008 | Oohira | |
| 2011/0242146 A1 | 10/2011 | Uchida et al. | |
| 2011/0273907 A1 | 11/2011 | Iwasaki | |
| 2011/0286241 A1 | 11/2011 | Pan et al. | |
| 2011/0317447 A1 | 12/2011 | He | |
| 2012/0014136 A1 | 1/2012 | Lee et al. | |
| 2013/0242600 A1* | 9/2013 | Franklin | G02B 6/0073 |
| | | | 362/602 |

FOREIGN PATENT DOCUMENTS

| | | |
|---|---|---|
| JP | 2008159274 A | 7/2008 |
| JP | 2009181962 A | 8/2009 |
| JP | 2010217637 A | 9/2010 |
| JP | 2010251051 A | 11/2010 |
| JP | 3169962 U | 8/2011 |
| JP | 2011238432 A | 11/2011 |
| WO | 2014053832 A1 | 4/2014 |

OTHER PUBLICATIONS

International Search Report received for Patent Application No. PCT/GB2013/052567, mailed on Dec. 4, 2013. 4 pages.

GB Intellectual Property Office Search Report under Section 17(5) received for GB Patent Application No. 1217735.8 mailed Feb. 4, 2013. 3 pages.

International Preliminary Report on Patentability and Written Opinion received for Patent Application No. PCT/GB2013/052567, mailed on Apr. 16, 2015. 7 pages.

* cited by examiner

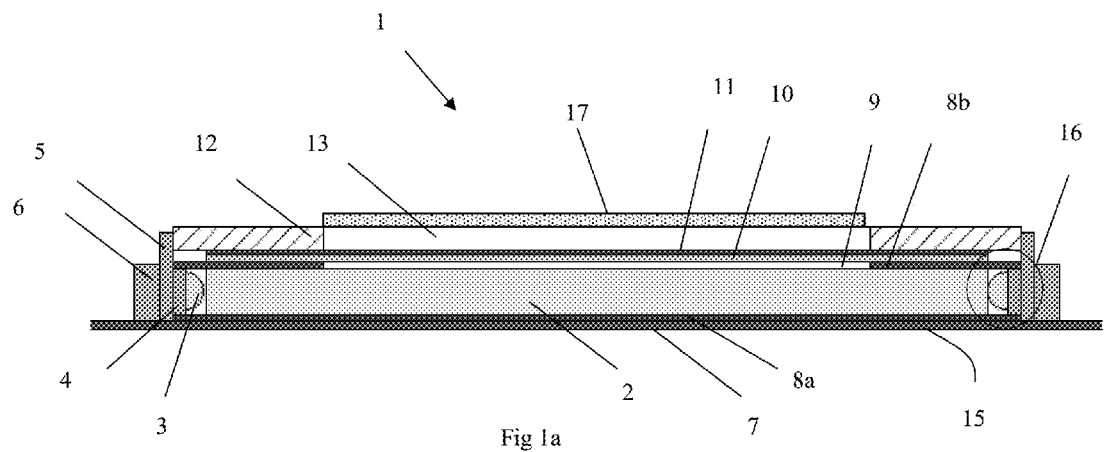
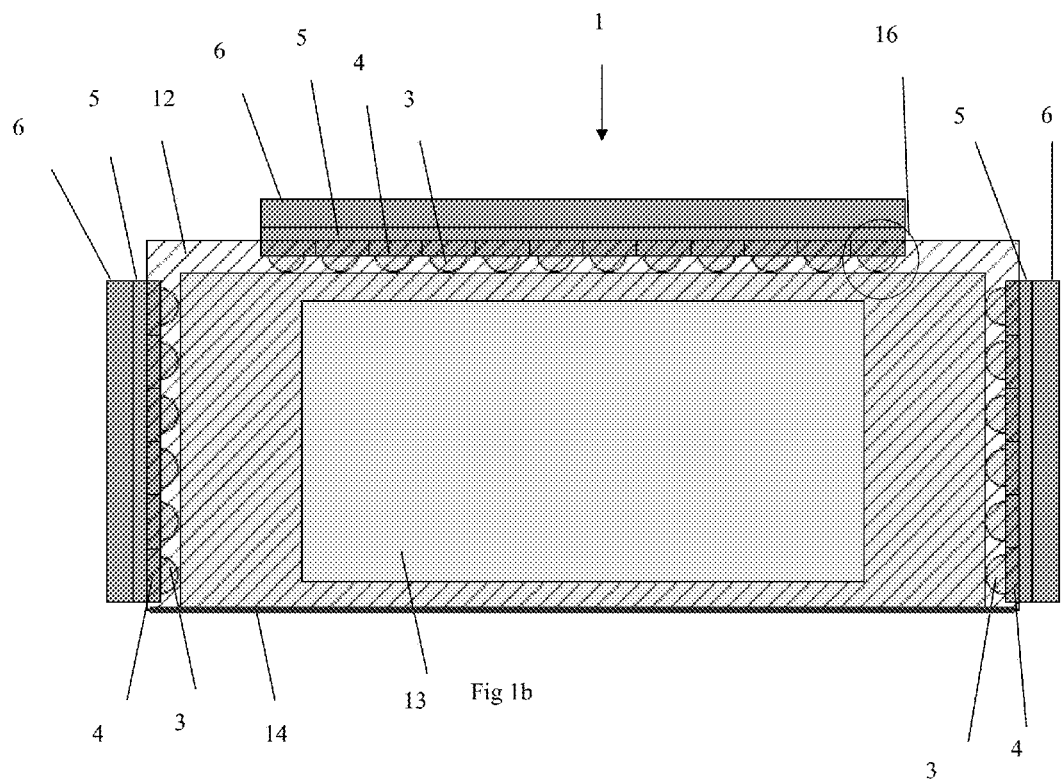

LCD BACKLIGHT DEVICE HAVING LIGHT GUIDE PLATE WITH OPTICAL SCATTERING DOTS

The following invention relates to an improved Liquid Crystal Display (LCD) Backlight, particularly to a compact backlight display module for use with a Head Up Display (HUD) device, more particularly to an improved arrangement of the optical scattering dots within the diffusing plate.

LCD devices typically comprise a backlight module having a light source, with various light manipulating devices to illuminate a liquid crystal panel. The light output from the module is preferably uniform to ensure that the image is adequately illuminated and there is an acceptable degree of luminance from the output. A typical backlight module is shown in U.S. 2011317447.

Before the present invention is described in further detail, it is to be understood that the invention is not limited to the particular embodiments described, as such may, of course, vary. It is also to be understood that the terminology used herein is for the purpose of describing particular embodiments only, and is not intended to be limiting, since the scope of the present invention will be limited only by the appended claims.

According to a first aspect of the invention there is provided a backlight module device for illuminating an LCD, comprising: a housing comprising a first reflective coating located on an inner surface of the housing;
a light guide plate with an upper and lower surface, received within the housing for converting light beams into a corresponding surface light source, emitted from said upper surface.
the light guide plate comprises of a lower surface which is formed with a plurality of optical scattering dots, which scatter and reflect the light beams to convert the light beams into a uniform surface light source,
an illumination source, comprising a plurality of LED lights located on three edges of the light guide plate, said plate received within the housing, for providing light beams;
a diffuser film received within the housing and mounted on the upper surface of the light guide plate, the diffuser film further unifying the light beams from the light guide plate;
two orthogonally co-located brightness enhance films received within the housing and mounted on the diffuser film,
characterised wherein the surface area of each optical dot decreases as a function of its distance from at least one of the three edges comprising the LED lights.

Edge lit displays may be illuminated from any number of edges, clearly the more edges that are illuminated the greater the brightness output from the backlight module. However, LCD devices are required to fit into ever smaller volumes. There is a desire to reduce the size of the device and hence reduce the number of edges that are required to be illuminated, retaining a high light output. Conventionally light guide plates with optical dot scatterers are typically arranged such that as the surface area of the optical dot increases as a function of distance from the LED edge illumination source. However, where the distance between the edge of the guide plate and the start of the optically transparent aperture is minimised, such as, for example less than 10% of the total width of the aperture, preferably less than 5%, then the arrangement of the optical scattering dots is preferably configured to enhance output uniformity such that the surface area of each optical dot decreases as a function of its distance from at least one of the three edges comprising the LED lights.

These modifications have provided backlight luminance of 400,000 cd/m^2 compared with an expected 160,000 cd/m^2, without modification.

The optical scattering dots may be selected from any polygonal shape, but are preferably substantially circular and the effective radius of said optical scattering dots decreases as a function of distance from at least one of the three edges comprising the LED lights. The optical scattering dots may have a three dimensional geometry to increase further the surface area.

In a preferred arrangement the effective radius of each of said optical scattering dots decreases as a function of distance from all three edges comprising the LED lights.

The housing is simply a means for protecting the optical guide, and the illumination source. In a preferred arrangement to further reduce the volume of the device the housing may be formed from a mounting plate and substantially vertically upstanding walls, said walls comprising the illumination source.

The illumination source is formed from a plurality of LEDs, mounted on printed circuit boards (PCB), said boards being further mounted on a heat sink, wherein each LED comprises an emitting structure and a lens to reduce the divergence of the light output and hence enhance coupling efficiency into the optical guide.

Backlight module devices try to minimise light leakage from the light guide plate and attempt to re-reflect any light that is emitted from the other face or un illuminated edges. In a preferred arrangement the light guide plate has a white reflector located on the upper and lower surface, wherein the white reflector on said upper surface has an optically transparent aperture which corresponds to the size of the LCD display. The white reflector reflects light back into the light guide.

The outmost optical component is a display mask plate, which is located on the two BEF films, wherein said display mask plate comprises a reflective or absorptive coating, with an optically transparent aperture which corresponds to the size of the LCD display. The display mask transparent aperture ensures that only light being emitted from the module is that which corresponds to the same area as the LCD unit optionally located thereupon.

The display mask provides an aperture, wherein along at least two opposing edges, the width of said reflective or absorptive coating is 10% of the aperture width, preferably 5%.

The light guide plate may be fabricated from any optically transparent material, preferably acrylic.

An embodiment of the invention will now be described by way of example only and with reference to the accompanying drawings of which:

FIGS. 1a and 1b show side and top views of the backlight module.

Figure 2:
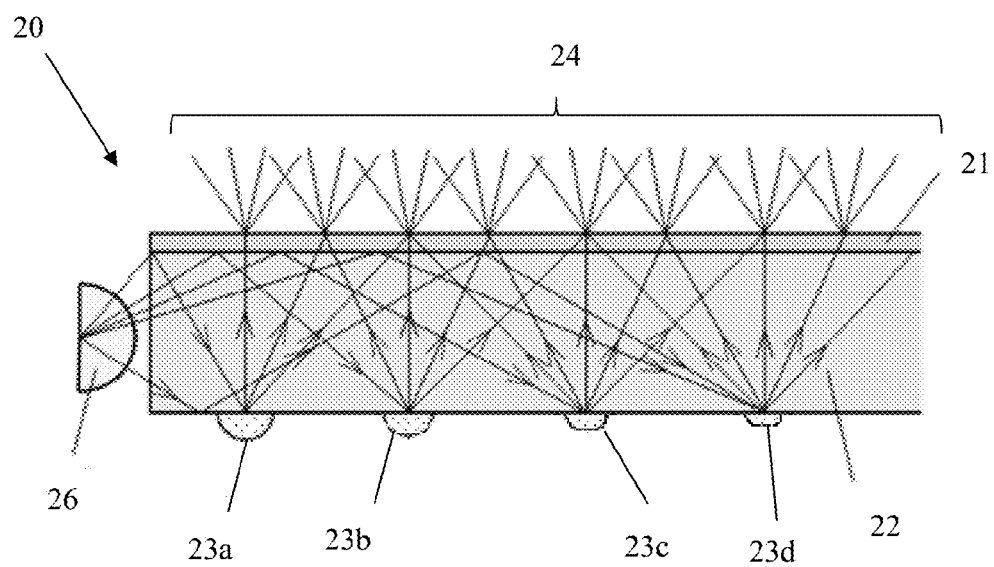
FIG. 2 shows a side view of the light guide plate and optical scattering dots.

Turning to FIG. 1a there is provided a backlight module generally shown at 1. There are a plurality of illumination sources 16. The illumination source is formed from a heat sink 6, onto which is mounted a printed circuit board 5. The circuit 5 contains a plurality of LEDs 4, which have their output focused by means of a lens 3.

The illumination source 16 is located on three of the edges (as shown in FIG. 1b) of a light guide plate 2. The lower surface of the light guide plate 2 is formed with a plurality of optical scattering dots (not-shown—see FIG. 2) and is encapsulated by at least one layer of a white reflector 8a, 8b. The lower white reflector layer 8a covers the entire lower face of the light guide plate 2. White reflectors 8a, 8b, reflects light back into the light guide plate. The upper white reflector layer 8b, has an optically transparent aperture 9 which allows the light from the light guide to leave the device. Located on top of the aperture 9, is a diffuser film 10, which further unifies the output luminance. Two orthogonally co-located brightness enhancement films shown generally at 11, are located on the diffusing plate 10. The final optical component is a display mask layer 12, with an optically transparent aperture 13, wherein the aperture 13 has substantially the same area as the LCD display 17 which is to be illuminated and projected.

The housing 15 is formed from a mounting plate 7, on which is located three sides of edge illumination sources 16. From figure 1b, the fourth edge 14 has no illumination source, and is provided instead with a layer of white reflector.

Turning to FIG. 2, there is shown a light guide 20, comprising a light guide plate 22, with light entering from the illumination source 26. On the lower surface of light guide plate 22, is located a plurality of optical scattering dots (23a-23d), whose surface area decreases as a function of their distance from the edge illumination source 26. The light guide employs a diffusing film 21, to further unify the light output 24, to the LCD display.

The invention claimed is:

1. A backlight module device for illuminating a liquid crystal display (LCD), the device comprising:
    a housing comprising a first reflective coating located on an inner surface of the housing;
    a light guide plate within the housing and for converting light beams into a corresponding surface light source emitted from an upper surface of the light guide plate comprising a lower surface which is formed with a plurality of optical scattering dots, which scatter and reflect the light beams to convert the light beams into a uniform said surface light source;
    an illumination source comprising a plurality of LED lights located on three edges of the light guide plate and for providing the light beams;
    a diffuser film within the housing and mounted on the upper surface of the light guide plate, the diffuser film for unifying the light beams from the light guide plate; and
    two orthogonally co-located brightness enhance films within the housing and mounted on the diffuser film,
    wherein there is a function of distance from at least one of the three edges comprising the LED lights such that for any two adjacent said optical scattering dots, the nearer of the two adjacent optical scattering dots from the at least one of the three edges has a larger surface area than the farther of the two adjacent optical scattering dots.

2. The device according to claim 1, wherein the optical scattering dots are substantially circular, and an effective radius of said optical scattering dots decreases as the function of distance from the at least one of the three edges comprising the LED lights.

3. The device according to claim 1, wherein the optical scattering dots are substantially circular, and an effective radius of said optical scattering dots decreases as a function of distance from all three of the three edges comprising the LED lights.

4. The device according to claim 1, wherein the housing is formed from a mounting plate and substantially vertically upstanding walls, said walls comprising the illumination source.

5. The device according to claim 1, wherein the plurality of LED lights are mounted on printed circuit boards, each printed circuit board mounted on a heat sink, wherein each LED light comprises an emitting structure and a lens to reduce divergence of light output and to enhance coupling efficiency into the light guide plate.

6. The device according to claim 1, wherein the light guide plate has a white reflector located on the upper and lower surfaces, wherein the white reflector on said upper surface has an optically transparent aperture which corresponds to a size of the LCD.

7. The device according to claim 1, wherein a display mask plate is located on the brightness enhance films, wherein said display mask plate comprises a reflective or absorptive coating, with an optically transparent aperture which corresponds to a size of the LCD.

8. The device according to claim 7, wherein along at least two opposing edges of the display mask plate, said reflective or absorptive coating has a width that is less than 10% of a total width of the optically transparent aperture.

9. The device according to claim 1, wherein the light guide plate is made from acrylic.

10. A head up display projection system comprising the backlight module device according to claim 1.

11. A backlight module device for illuminating a liquid crystal display (LCD), the device comprising:
    a light guide plate for converting light beams into a corresponding surface light source emitted from an upper surface of the light guide plate, the light guide plate comprising a lower surface which is formed with a plurality of optical scattering dots, which scatter and reflect the light beams to convert the light beams into a uniform said light source; and
    an illumination source comprising a plurality of LED lights located on three edges of the light guide plate and for providing the light beams,
    wherein there is a function of distance from at least one of the three edges comprising the LED lights such that for any two adjacent said optical scattering dots, the nearer of the two optical scattering dots from the at least one of the three edges has a larger surface area than the farther of the two adjacent optical scattering dots.

12. The device according to claim 11, wherein the optical scattering dots are substantially circular, and an effective radius of said optical scattering dots decreases as the function of distance from the at least one of the three edges comprising the LED lights.

13. The device according to claim 11, wherein the optical scattering dots are substantially circular, and an effective radius of said optical scattering dots decreases as a function of distance from all three of the three edges comprising the LED lights.

14. The device according to claim 11, further comprising a housing comprising a first reflective coating located on an inner surface of the housing, wherein the housing is formed from a mounting plate and substantially vertically upstanding walls, said walls comprising the illumination source.

15. The device according to claim 11, wherein the plurality of LED lights are mounted on printed circuit boards, each printed circuit board mounted on a heat sink, wherein each LED light comprises an emitting structure and a lens to reduce divergence of light output and to enhance coupling efficiency into the light guide plate.

16. The device according to claim 11, wherein the light guide plate has a white reflector located on the upper and lower surfaces, wherein the white reflector on said upper surface has an optically transparent aperture which corresponds to a size of the LCD.

17. The device according to claim 11, further comprising:
   a diffuser film mounted on the upper surface of the light guide plate, the diffuser film for unifying the light beams from the light guide plate; and
   two orthogonally co-located brightness enhance films mounted on the diffuser film,
   wherein a display mask plate is located on the brightness enhance films, wherein said display mask plate comprises a reflective or absorptive coating, with an optically transparent aperture which corresponds to a size of the LCD.

18. The device according to claim 17, wherein along at least two opposing edges of the display mask plate, said reflective or absorptive coating has a width that is less than 10% of a total width of the optically transparent aperture.

19. The device according to claim 11, wherein the light guide plate is made from acrylic, the device further comprising:
   a diffuser film mounted on the upper surface of the light guide plate, the diffuser film for unifying the light beams from the light guide plate; and
   two orthogonally co-located brightness enhance films mounted on the diffuser film.

20. A head up display projection system comprising the backlight module device according to claim 11.

* * * * *